2,968,682
PROCESS FOR SULFURIC ACID EXTRACTION OF TERTIARY OLEFINS

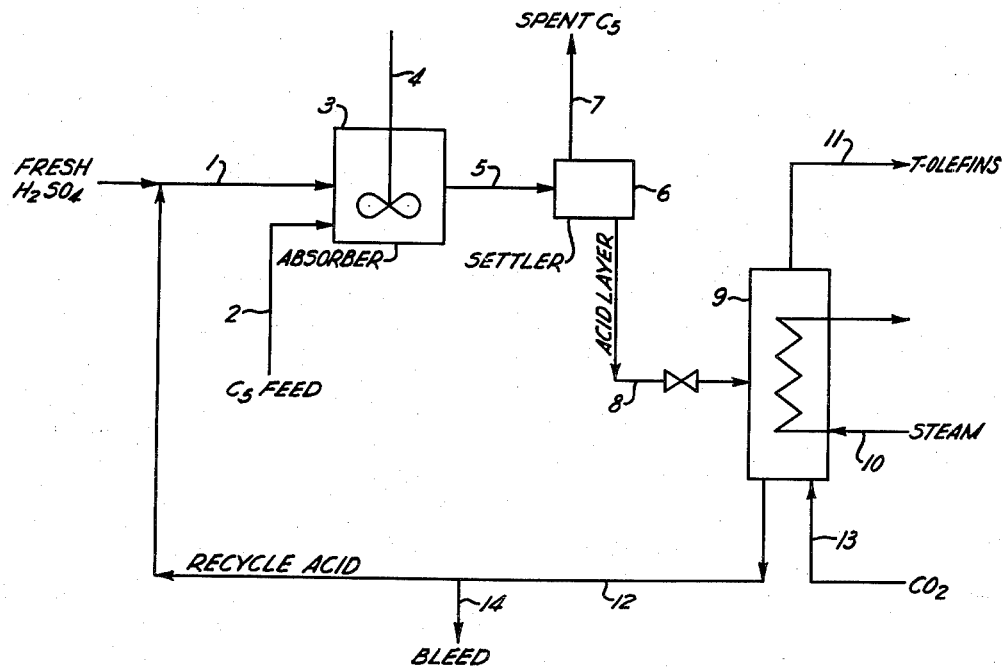

Benjamin F. Crouse, Jr., East Alton, Ill., and Arthur C. Whitaker, Pittsburgh, Pa., assignors to Gulf Research & Development Company, Pittsburgh, Pa., a corporation of Delaware Filed July 29, 1958, Ser. No. 751,745

8 Claims. (Cl. 260—677)

This invention relates to the separation of tertiary olefins (olefins which can form a tertiary alcohol on hydration) having carbon numbers from $C_4$ to $C_6$ from mixtures of these olefins with close boiling non-tertiary olefins and other hydrocarbons. In particular, this invention is concerned with the separation of 2 methyl butene-1 and 2 methyl butene-2 from other close boiling $C_5$ molecules such as pentene-1 by absorption of the tertiary $C_5$ olefins in sulfuric acid followed by desorption by indirect heating without dilution of the acid. The acid can then be recycled for additional absorption without reconcentration or used in some other process.

In the separation of tertiary olefins from other close boiling molecules by absorption of the tertiary olefins in sulfuric acid, it has been found that isobutylene can be selectively absorbed from a $C_4$ fraction and 2 methyl butene-1 and 2 methyl butene-2 can be selectively absorbed from a $C_5$ fraction by sulfuric acid under the proper conditions. The process of desorbing the tertiary olefins has usually been done by direct heating of the acid with steam which dilutes the acid and requires then the expensive step of reconcentration of the acid for further use in absorbing more tertiary olefins.

We have discovered in accordance with the invention that tertiary olefins can be efficiently separated from a mixture containing these olefins and close boiling components comprising non-tertiary olefins and/or other hydrocarbons by first contacting the mixture with sulfuric acid having $H_2SO_4$ concentration below 65 percent under conditions such that substantially only the tertiary olefins are absorbed in the acid, separating the acid containing absorbed tertiary olefins from the unabsorbed hydrocarbons and then regenerating the tertiary olefins from the acid by heating with indirect heat to a temperature above 40° C. We have found that by proceeding as described, efficient separation of the tertiary olefins from the remainder of the mixture is accomplished, and the desorption of these olefins from the acid proceeds efficiently. Moreover, the final acid removed from the desorber retains substantially its original concentration. We have found that this final acid can be recycled directly (i.e. without reconcentration and only bleed purification) to the absorption zone, or used in other parts of refinery, for example in deasphalting crudes or removing the color or sludge impurities in cracked gasolines or other petroleum distillates.

The upper limit of the concentration of $H_2SO_4$ in the acid in this process is critical and is determined by considerations in both the absorption and desorption stages. The two primary objects of this invention are to obtain high purity tertiary olefins and also recover an acid from the regeneration step which has substantially the same $H_2SO_4$ concentration as the original starting acid. In order to achieve these objects, the acid must be maintained below a 65 percent $H_2SO_4$ concentration. We have found that the selectivity of the acid for absorbing tertiary olefins from the mixture decreases as the concentration of $H_2SO_4$ in the acid increases over 65 percent even though the capacity of the acid for tertiary olefins increases. This means that when the sulfuric acid is over a 65 percent $H_2SO_4$ concentration, the percentage recovery of the tertiary olefins increases, but the purity decreases as increasing amounts of other $C_5$ hydrocarbons are also being absorbed. It has also been found that if the sulfuric acid is over a 65 percent $H_2SO_4$ concentration, it is necessary to dilute the acid before regeneration of the tertiary olefins, for these olefins will polymerize on heating to over 40° C. in the presence of acid of over a 65 percent $H_2SO_4$ concentration. The lower concentration of the sulfuric acid is not critical but for practical reasons the concentration should be as high as possible to take advantage of the greater capacity of the acid for tertiary olefins at the higher concentrations and to reduce the amount of olefin which is converted to alcohol at the lower concentrations. The acid concentration can vary then between about 40 and 65 percent, but preferably should be between about 55 and 60 percent.

The temperature of the absorption is not critical and can vary from the freezing point of the acid to the vaporization temperature of the feedstock. The temperatures can vary between about $-15°$ C. to about $+40°$ C., but preferably the temperature is between 0° and 20° C. It is preferred that the charge stock containing the tertiary olefins be kept in a liquid phase for better contacting with the sulfuric acid.

The pressure in the absorption step is likewise not critical and can vary over a wide range. The preferred pressure for the absorption is atmospheric since no special equipment is required. However, increased pressures can be used if the higher absorption temperatures are desired in order to maintain the feed in the preferred liquid phase. Decreased pressures can be used but are not desired due to increased costs and vaporization of the feed.

The volumetric hydrocarbon to acid ratio can vary between about 3:1 to 0.5:1, but is preferably between 2:1 and 1:1. At the lower hydrocarbon to acid ratios, a higher proportion of tertiary olefins will be absorbed, but in like manner a higher proportion of the other close boiling components will also be absorbed. In addition, the possibility for polymerization of the tertiary olefins also increases.

The contact time in the absorption step is not critical and can vary between about 5 and 120 minutes, but between about 30 and 60 minutes is preferred. As the contact time decreases, of course, the amount of tertiary olefins absorbed also decreases until the process is no longer attractive. As the contact time increases, there is more of an opportunity for the olefins which are absorbed to polymerize but polymerization is not a problem even at prolonged contact times if the temperature of absorption is maintained between 0° and 20° C. At the higher acid concentrations, say 65 percent, less time is required for absorption due to the increased absorption capacity of the acid.

We prefer to have the mixture of tertiary olefins in the liquid phase to achieve better contacting of the feed with the acid. We have found that the efficiency of separation of tertiary olefins depends on the contacting achieved between the acid and the hydrocarbon and that the power which is necessary to achieve good contacting, and hence good efficiencies of at least 50 percent or more, is between about 0.4 horsepower per barrel of hydrocarbon plus acid and 3 horsepower per barrel of hydrocarbon plus acid and preferably about 0.75 to 1.75 horsepower per barrel of hydrocarbon plus acid. The absorption can be performed in a batch operation with high speed stirring mechanisms to insure good contact between the acid and hydrocarbon, a continuous absorption using jets of hydrocarbon and acid, or a coil or other type reactor can be employed.

After absorption the unabsorbed hydrocarbons and acid are separated by settling or by the use of a continuous centrifuge. The unabsorbed hydrocarbons are recycled if desired or sent to other processing. The acid layer is removed and heated to release the tertiary olefins which were absorbed by the sulfuric acid.

We have found the upper limit of the concentration of acid in the desorption step to be critical. As mentioned above, if the sulfuric acid concentration is above 65 percent, the tertiary olefins will polymerize on heating to temperatures over 40° C. It is preferred that the acid concentration be between 55 and 60 percent to obtain the maximum absorption of tertiary olefins while being able to practice the main facet of this invention, namely, the release and recovery of the purified tertiary olefins without polymerization by simple indirect heating without dilution while at the same time recovering the acid in substantially the same $H_2SO_4$ concentration as the starting acid.

The pressure in this desorption step is not critical but it is preferred to have the pressure below atmospheric. The pressure can vary between 50 mm. of Hg and 15 pounds per square inch gauge but is preferably under vacuum and more preferably between 90 and 200 mms. of Hg. The reduction in pressure allows for a lower temperature of desorption which leads to less polymer formation. The reduction in pressure also serves to remove the tertiary olefins as quickly as they are released by the acid. The longer the olefins are in contact with the sulfuric acid at the elevated desorption temperatures, the more likelihood there is of loss of tertiary olefins through polymerization, and sulfate formation.

Besides a reduction in pressure, we have found that an inert purge gas will serve to remove the tertiary olefins from the desorption zone as quickly as they are released by the acid. These gases might include carbon dioxide, nitrogen, carbon monoxide, argon, etc. The inert gas can be bubbled through the acid or used as a sweep gas over the top of the acid. During desorption the acid should be stirred to allow the released olefins to be removed from contact with the acid as quickly as possible.

The temperature of desorption is important to insure first, that olefins are released, and second, that they are released as monomers and not as polymers. We have found that the temperature should be at least 40° C. to permit the release of the olefins, but not above about 70° C. or excessive polymerization of the olefins will occur even at concentrations of acid as low as 45 percent. The temperature can vary therefore from 40° C. to 70° C., but the temperature is preferably between 50° and 65° C.

The temperature and pressure of desorption to avoid polymerization are somewhat interdependent so that the lower pressures may require slightly lower temperatures, but still above 40° C., to achieve this desorption. Lower temperatures are also required if an inert purge gas is used. The inert purge gas can also aid in heating the acid.

The rate of heating to the desired desorption temperature is not critical but it should be as fast as possible to allow less time for the olefins to polymerize. The rate of heating can vary between about 1° to about 20° C. per minute. The design of the heat transfer equipment should be such that local hot spots encouraging polymerization are avoided.

The length of time at which the desorption temperature should be held at its maximum is not critical but sufficient time should be allotted to permit most of the tertiary olefins to be released and removed. The time can vary between 30 and 120 minutes but normally 45 to 75 minutes are sufficient at the preferred temperatures and acid concentrations.

The invention will now be described with reference to the attached drawing which discloses one preferred embodiment of this invention. Referring now to the drawing, a mixture of fresh and recycle sulfuric acid of 50 to 60 percent $H_2SO_4$ concentration is fed through line 1 into absorber 3 which is provided with a stirrer 4. A mixture of $C_5$ hydrocarbons containing some 2-methyl butene-1 and 2-methyl butene-2 is fed through line 2 to the absorber 3. This mixture of $C_5$ hydrocarbons can be obtained from a thermal or catalytic cracking unit. The 2-methyl butene-1 and 2 cannot be separated conveniently from the other $C_5$ hydrocarbons by distillation as the boiling points are too close. Pure $C_5$ tertiary olefins are desirable as charge stocks for the production of isoprene by dehydrogenation, for any straight chain $C_5$ olefins present in the charge stock to the dehydrogenation unit will result in the production of piperylene which is very difficult to separate from isoprene. The sulfuric acid and the $C_5$ mixture are contacted in vessel 3 at temperatures of between 0° and 20° C. for about 30 to 60 minutes at atmospheric pressure, with a stirring rate equivalent to about 1.3 horsepower per barrel of mixture and a volume hydrocarbon to acid ratio of between about 3:1 and 1:1. Under these conditions, the 2-methyl butene-1 and 2-methyl butene-2 are selectively absorbed in preference to the other components in the $C_5$ fraction. After absorption, the mixture of hydrocarbon and acid is transferred by line 5 to a vessel 6 where the mixture is allowed to settle and the unreacted $C_5$ components are removed through line 7. The acid layer containing the absorbed tertiary olefins is transferred through line 8 to a vessel 9 equipped with a steam coil 10 which heats the acid layer indirectly at a rate between 2° and 20° C. per minute to above 40° C., for example, 41° C. to 65° C. The temperature is maintained at the higher level for about one hour while the tertiary olefins which are released from the acid during the heating are removed from vessel 9 through line 11. $CO_2$ can be added to vessel 9 through line 13 to aid in the removal of the tertiary olefins if desired. The regenerated acid having substantially the same concentration as the starting acid is removed from vessel 9 through line 12 and is recycled to line 1 where it is combined with make-up quantities of fresh acid before it is reused in the absorption vessel. A bleed line 14 is maintained on the recycle sulfuric acid to maintain a low level of sulfate or other impurities. Although the attached drawing shows the regenerated acid being recycled directly through line 12 to be combined with make-up fresh acid, it is to be understood that the regenerated acid can be placed into surge tanks or storage tanks to account for any fluctations in feed rate.

The process of this invention will be further described with reference to the following specific examples.

A mixture of $C_5$ hydrocarbons containing by weight 33 percent isopentane, 10 percent pentene-1, 9 percent pentene-2, 18 percent 2-methyl butene-1, and 30 percent 2-methyl butene-2 was prepared to simulate a $C_5$ fluid distillate. This mixture was used in all of the experiments to be described below and will be referred to as the $C_5$ blend. n-Pentane was not included in this blend since its solubility in sulfuric acid is similar to that of isopentane.

*Example 1*

Equal volumes (200 ccs. each) of the $C_5$ blend and 60 percent sulfuric acid were placed into a 1000 cc. flask and stirred for 60 minutes while the temperature was maintained at 7.5° C. by an ice bath. At the end of the one-hour period, the contents were transferred to a precooled separatory funnel and the bottom or acid layer was removed and sent to a desorption flask. The hydrocarbon layer was analyzed to determine the amount and type of constituents which had been absorbed. The pressure in the desorption vessel was reduced by means of a vacuum pump to 100 mms. mercury. Two Dry Ice traps were inserted between the desorption flask and the vacuum pump to collect the evolved material. The vessel was heated indirectly by a water bath at the rate of 3° C. per minute until a temperature of 54.5° C. was reached. This temperature was maintained for 60 minutes and the material evolved due to the heating was condensed in the Dry Ice traps and sent for analysis. The used acid was also analyzed and was found to have substantially the same concentration as the starting acid.

The sulfuric acid absorbed 83.5 percent by weight of the isopentenes in the charge while absorbing only 3.7 percent by weight of n-pentenes and 3.7 percent by weight of the isopentanes in the charge. Upon desorption 73.4 percent by weight of the isopentenes in the charge were recovered as the monomer, 4.8 percent by weight of the isopentens in the charge were recovered as an alcohol, and no polymer was detected. This amounted to a 93 percent recovery of the isopentenes absorbed. It was found that most of the 2-methyl butene-1 had been converted to 2-methyl butene-2 by the acid but either isomer is a good charge stock for the production of isoprene. The t-amyl alcohol was dehydrated and combined with the 2-methyl butene-2 to produce an isopentene monomer charge stock of 98.1 percent purity in 37.1 weight percent yield of the original $C_5$ blend.

*Example 2*

The same quantities of materials and method of procedure were employed in this example as in Example 1 except the regenerated acid from Example 1 was used, the absorption temperature was raised to 15.5° C. and the desorption temperature was slightly higher at 61.5° C.

The percentage absorption of isopentenes dropped slightly to 77.9 percent by weight of the isopentene in the charge while the percentage absorption of the n-pentenes increased to 5.3 percent by weight of the n-pentene fraction in the charge and the percentage of isopentane also increased to 6.0 percent by weight of the isopentane fractions in the charge. The changes were not large, indicating that the change in absorption temperature from 7° to 15° C. was not critical.

Upon desorption, 63.2 weight percent of the isopentenes in the charge were recovered as monomer and 6.6 weight percent of the isopentenes in the charge were recovered as the $C_5$ alcohol, with no trace of polymer. This amounted to a 90 percent recovery of the isopentenes absorbed. The alcohol was then dehydrated and the olefin combined with the monomer to give a 33.3 weight percent yield of monomer based on the $C_5$ blend with a purity of 97.0 percent.

*Example 3*

The same procedure was followed as in Examples 1 and 2 except the absorption time was decreased from 60 minutes to 30 minutes. The sulfuric acid concentration was 60 percent and the absorption temperature was maintained at 6.5° C. for only 30 minutes. As a result of this decreased time, only 55.7 weight percent of the isopentenes in the charge were absorbed, but the absorption of the n-pentenes (5.3 weight percent) and isopentane (5.0 weight percent) was still of the same order of magnitude.

The desorption conditions were 61° C. at 100 mm. mercury for 60 minutes and resulted in a percentage recovery of the absorbed isopentene of about 90 percent, which is similar to recoveries in Examples 1 and 2. The weight percent of isopentene in the original $C_5$ blend recovered as monomer was 42.8, while 6.8 weight percent of the isopentenes were recovered as the alcohol. After dehydration of the alcohol, the combined olefin streams totaled 23.2 percent of the orginal $C_5$ blend by weight and had a purity of 95.7 percent isopentenes.

*Example 4*

The procedure here was the same as in Example 3 except the sulfuric acid concentration was increased to 65 percent. As a result of this increase, 88.3 percent of the isopentenes in the charge were absorbed, but, in addition, 16.5 weight percent of the n-pentenes in the $C_5$ blend were absorbed along with 19.1 weight percent of the isopentane in the $C_5$ blend. The desorption was conducted at 59.5° C. and 100 mm. mercury for 60 minutes after a gradual heating, but, due to the increased concentration of the sulfuric acid, 28 percent of the isopentenes in the charge were recovered as undesirable polymer while only 49.8 weight percent of the isopentenes in the original $C_5$ blend were recovered as monomer and 3.0 percent recovered as the alcohol. The percentage recovery of monomer and alcohol of the isopentenes absorbed was only 60 percent compared to 90 percent in the runs using 60 percent sulfuric acid. The alcohol was dehydrated and combined with the monomer isopentene to give a 90.6 percent purity isopentene charge stock in a yield based on an original $C_5$ blend of 25.4 weight percent.

*Example 5*

This run was similar to Example 1 except the desorption temperature was slightly higher, 62° C. in this run vs. 54.5° C. in Example 1, and the desorption pressure in this run was increased to 200 mms. The absorption conditions were the same as in Example 1 and 81.1 percent of the isopentenes in the feed were absorbed. Upon desorption, 62.4 weight percent of the isopentenes in the feed were recovered as monomer, 3.7 weight percent were recovered as the alcohol, and 7.8 weight percent of the isopentenes were recovered as the polymer. Thus 81.5 percent of the absorbed isopentenes were recovered as a usable charge to an isoprene process. This recovery was lower than the 90 percent achieved at 100 mm. as in Example 1. The polymer formation is attributed to the increase in desorption pressure, for the change in desorption temperature from 54.5° to 61° C. resulted in the formation of no polymer as seen by comparing Example 2 with Example 1. The alcohol was dehydrated and the combined monomer and dehydrated alcohol analyzed 96.8 percent pure isopentene, which meant that 33 percent of the original $C_5$ blend was recovered for use as an isoprene charge stock.

*Example 6*

Another run was made in the same manner as in Example 5 except the desorption pressure was reduced to 150 mm. and, as expected, the amount of polymer decreased from 7.8 weight percent to 3.1 weight percent. The absorption of isopentene from feed was 84.6 percent. The desorption yielded 71.2 weight percent monomer and 5.3 percent alcohol in addition to the 3.1 weight percent polymer. The dehydrated alcohol and monomer were 98.5 percent pure isopentene. The yield of isopentene based on the original $C_5$ blend was 35.8 percent.

*Example 7*

This run was the same as Example 5 except carbon dioxide was used as an inert sweep gas during desorption to aid in removing the tertiary olefins as soon as released. The carbon dioxide served to decrease the partial pressure of the monomer above the acid and thus the recovery of the isopentene absorbed was equivalent to the recovery at lower desorption pressure.

After absorption in 60 percent sulfuric acid at 7° C. for 60 minutes, the acid layer was removed to the desorption vessel which was equipped with a means for inserting carbon dioxide beneath the surface of the acid layer. The mixture was slowly heated at a rate of 3° C./minute while carbon dioxide at a rate of 1000 ccs./minute was continuously added. The temperature was increased to 60° C. and maintained for 60 minutes. The monomer recovery was 73.0 weight percent of the isopentene in the feed. Also recovered was 5.7 percent alcohol and 3.9 percent polymer. Thus the addition of carbon dioxide not only served to recover a high percentage of the isopentene absorbed but also to decrease the amount of polymer formed.

After dehydration of the alcohol, the charge stock to the isoprene unit was 97.6 percent pure isopentene. The yield of isopentene based on the original $C_5$ blend was 37.4 percent.

*Example 8*

The absorption conditions in this run were the same as in Example 6, namely 60 percent sulfuric acid, 7° C. for 60 minutes, and 82.2 percent of the isopentenes in the feed were absorbed. The desorption conditions were altered however to study the effect of decreasing the desorption time and temperature.

The temperature during desorption was only increased to 40.5 C. at 90 mm. mercury and the time of desorption was reduced to 45 minutes. As a result of these changes, only 34.9 weight percent of the isopentenes in the feed were recovered as monomer, 1.6 percent as polymer, and 3.9 percent as the alcohol. This accounted for only 49 percent of the isopentenes which had been absorbed. The purity of the isopentene charge stock was over 94 percent, but the recovery of the isopentene based on the original $C_5$ blend was only 18.3 percent. It was evident that the temperature of desorption was below the preferred temperature.

*Example 9*

This run was the same as Example 7 except that after 30 minutes of desorption at 40° C., the temperature was increased to 59° C. for an additional 30 minutes. The result was a 90 percent recovery of absorbed isopentenes. The purity of the isopentene charge stock was 96.9 percent with a recovery based on the original charge of 30.8 weight percent.

In the production of isoprene, the charge stock can be isopentenes or a mixture of isopentenes and t-amyl alcohol. The alcohol merely dehydrates providing additional steam which is required in the process. Consequently, the small amounts of alcohol produced in the above process are not detrimental if the charge stock is to be used to produce isoprene. If a pure isopentene charge stock is desired, the alcohol can be dehydrated by passing the alcohol through a bed of activated alumina at 400° to 500° C. at atmospheric pressure.

Obviously many modifications and variations of the invention as hereinabove set forth may be made without departing from the spirit and scope thereof, and therefore only such limitations should be imposed as are indicated in the appended claims.

We claim:
1. A process for the recovery of the tertiary olefinic content of a mixture containing at least one tertiary olefin containing 4 to 6 carbon atoms and at least one close boiling other hydrocarbon, consisting essentially of contacting the mixture with sulfuric acid having an $H_2SO_4$ concentration below 65 percent under conditions including a temperature not exceeding 40° C. such that substantially only the tertiary olefinic content of the mixture is absorbed in the acid, separating the resulting acid from the unabsorbed other hydrocarbon content, heating without dilution the acid containing the absorbed tertiary olefinic content with indirect heat at the rate of between 1° to 20° C. per minute to a temperature above 40° C. but not above about 70° C., and recovering the resulting tertiary olefinic content of the mixture and an acid having substantially the same $H_2SO_4$ concentration as the original acid.

2. A process according to claim 1 wherein the mixture subjected to treatment contains a plurality of tertiary olefins containing 4 to 6 carbon atoms and a plurality of other close boiling hydrocarbons.

3. A process according to claim 1 wherein the tertiary olefins to be separated are 2-methyl butene-1 and 2-methyl butene-2 from a mixture of these tertiary olefins with other $C_5$ hydrocarbons.

4. A process for the separation of 2-methyl butene-1 and 2-methyl butene-2 from a mixture containing such tertiary olefins and other close boiling hydrocarbons consisting essentially of contacting the mixture with sulfuric acid having an $H_2SO_4$ concentration below 65 percent under conditions including a temperature of between 0 and 20° C. such that substantially only the tertiary olefins are absorbed in the acid, separating the acid containing the absorbed 2-methyl butene-1 and 2-methyl butene-2 from the unabsorbed hydrocarbons and heating without dilution the acid containing the absorbed 2-methyl butene-1 and 2-methyl butene-2 with indirect heat at the rate of between 1° to 20° C. per minute to a temperature above 40° C. but not above about 70° C., recovering a substantially pure stream of 2-methyl butene-1 and 2-methyl butene-2 and an acid which has substantially the same $H_2SO_4$ concentration as the original acid, and recycling the recovered acid to the absorption stage.

5. A process for the separation of 2-methyl butene-1 and 2-methyl butene-2 from a mixture containing such tertiary olefins and other close boiling hydrocarbons consisting essentially of contacting the mixture with sulfuric acid having an $H_2SO_4$ concentration below 65 percent under conditions including a temperature not exceeding 40° C. a ratio of hydrocarbon to acid between 3:1 and 0.5:1 and a contact time between 5 and 120 minutes such that substantially only the tertiary olefins are absorbed in the acid, separating the acid containing the absorbed 2-methyl butene-1 and 2-methyl butene-2 from the unabsorbed hydrocarbons and heating without dilution the acid containing the absorbed 2-methyl butene-1 and 2-methyl butene-2 with indirect heat at the rate of between 1° to 20° C. per minute to a temperature above 40° C. but not above about 70° C., recovering a substantially pure stream of 2-methyl butene-1 and 2-methyl butene-2 and an acid which has substantially the same $H_2SO_4$ concentration as the original acid, and recycling the recovered acid to the absorption stage.

6. A process for the separation of 2-methyl butene-1 and 2-methyl butene-2 from a mixture containing such tertiary olefins and other close boiling hydrocarbons consisting essentially of contacting the mixture with sulfuric acid having an $H_2SO_4$ concentration below 65 percent at a temperature between 0° and 20° C., a hydrocarbon to acid ratio between 3:1 and 0.5:1, a contact time between 5 and 120 minutes, and a mixing power input between 0.4 to 3.0 horsepower per barrel; separating the acid containing the absorbed 2-methyl butene-1 and 2-methyl butene-2 from the unabsorbed hydrocarbons and heating without dilution the separated acid at a pressure between 50 mms. of mercury and 15 pounds per square inch gauge with indirect heat at the rate of between 1° to 20° C. per minute to a temperature above 40° C. but not above about 70° C., recovering a substantially pure stream of 2-methyl butene-1 and 2-methyl butene-2 and an acid which has substantially the same $H_2SO_4$ concentration as the original acid, and recycling the recovered acid to the absorption stage.

7. A process for the separation of 2-methyl butene-1 and 2-methyl butene-2 from a mixture containing such tertiary olefins and other close boiling hydrocarbons consisting essentially of contacting the mixture with sulfuric acid having an $H_2SO_4$ concentration of 55 to 60 percent at a temperature between 0° and 20° C., at atmospheric pressure, a hydrocarbon to acid ratio between 3:1 and 0.5:1, a contact time between 5 and 120 minutes, and a mixing power input between 0.7 and 1.75 horsepower per barrel; separating the acid containing the absorbed 2-methyl butene-1 and 2-methyl butene-2 from the unabsorbed hydrocarbons and heating without dilution the separated acid at a pressure between 50 mms. of mercury and 15 pounds per square inch gauge with indirect heat at the rate of between 1° to 20° C. per minute to a temperature over 40° C. but not above about 70° C., recovering a substantially pure stream of 2-methyl butene-1 and 2-methyl butene-2 and an acid which has substantially the same $H_2SO_4$ concentration as the original acid, recycling the recovered acid to the absorption stage, and contacting the recovered stream of 2-methyl butene-1 and 2-methyl butene-2 with a dehydrogenation catalyst under conditions such that substantial proportions of isoprene are produced.

8. A process for the separation of the isopentenes 2-methyl butene-1 and 2-methyl butene-2 from a mixture containing the same and other close boiling hydrocarbons consisting essentially of intimately contacting the mixture with sulfuric acid having an $H_2SO_4$ concentration between about 55 and 60 percent at a temperature between about 0° and 20° C., at substantially atmospheric pressure, a hydrocarbon to acid ratio between about 2:1 and 1:1, and a contact time between about 30 and 60 minutes to absorb said isopentenes; separating the acid containing said isopentenes from the unabsorbed hydrocarbons; heating without dilution said separated acid at a pressure between about 90 mm. and 200 mm. of mercury with indirect heat at the rate of between 1° to 20° C. per minute to a temperature between about 50° and 65° C.; recovering from said heating a substantially pure isopentene stream and an acid which has substantially the same $H_2SO_4$ concentration as the original acid; and recycling the recovered acid to further contact with a hydrocarbon mixture containing said isopentenes.

References Cited in the file of this patent
UNITED STATES PATENTS

| | | |
|---|---|---|
| 1,970,687 | Brooks | Aug. 21, 1934 |
| 2,386,055 | Mottern | Oct. 2, 1945 |
| 2,443,245 | Hibshman | June 15, 1948 |
| 2,515,006 | Hudson | July 11, 1950 |
| 2,560,362 | Morrell et al. | July 10, 1951 |
| 2,581,065 | Arnold | Jan. 1, 1952 |
| 2,771,497 | Hunt et al. | Nov. 20, 1956 |